United States Patent

[11] 3,580,317

| [72] | Inventor | Clifford McHargue<br>P. O. Box 28, Lily, Ky. 40740 |
|---|---|---|
| [21] | Appl. No. | 785,196 |
| [22] | Filed | Dec. 19, 1968 |
| [45] | Patented | May 25, 1971 |

[54] DEVICE FOR EXTRACTING A MIRED MOTOR VEHICLE
11 Claims, 4 Drawing Figs.

[52] U.S. Cl. .................................................. 152/208,
180/7, 238/14, 305/55
[51] Int. Cl. ........................................................ B62d 57/00
[50] Field of Search .......................................... 152/208,
225; 305/55; 180/7; 238/14

[56] References Cited
UNITED STATES PATENTS

| 1,485,239 | 2/1924 | Tollackson .................. | 152/225 |
| 1,499,705 | 7/1924 | Strauss ....................... | 152/208 |
| 2,692,632 | 10/1954 | Snedeker ..................... | 152/225 |
| 2,993,738 | 7/1961 | Noble ......................... | 305/55 |
| 3,245,451 | 4/1966 | Gellman ...................... | 152/225 |

*Primary Examiner*—Leo Friaglia
*Attorney*—Browne, Schuyler & Beveridge

ABSTRACT: A device for removing a vehicle from a mired condition includes an elongated bar with an adjustable length. Connectors at the opposite ends of the bar are attached to spaced apart wheels or lugs of a vehicle. Powered movement of the wheels or lugs will move the bar against an undisturbed surface between the wheels or lugs to elevate the vehicle from its mired condition.

PATENTED MAY 25 1971 3,580,317
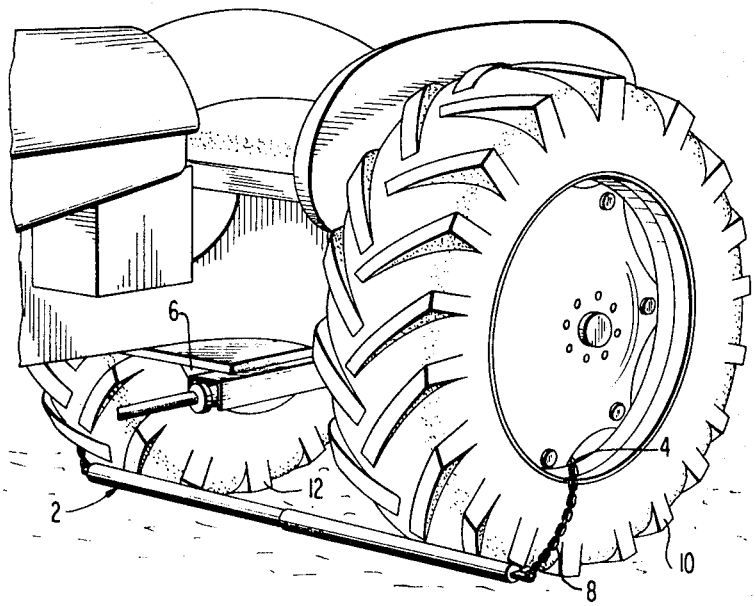
FIG.1
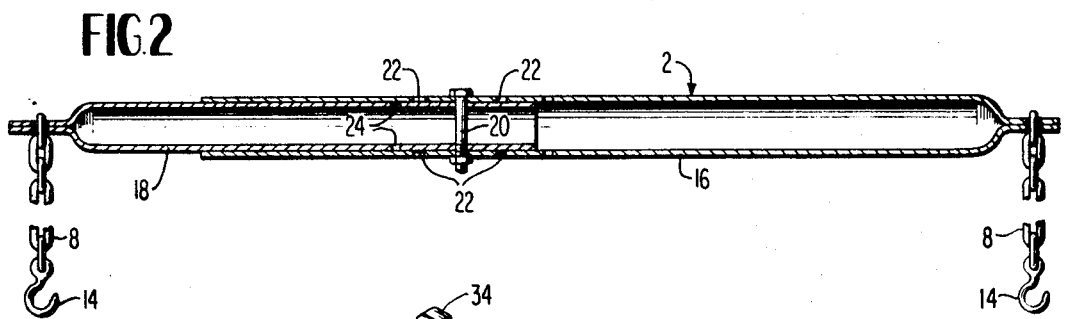
FIG.2
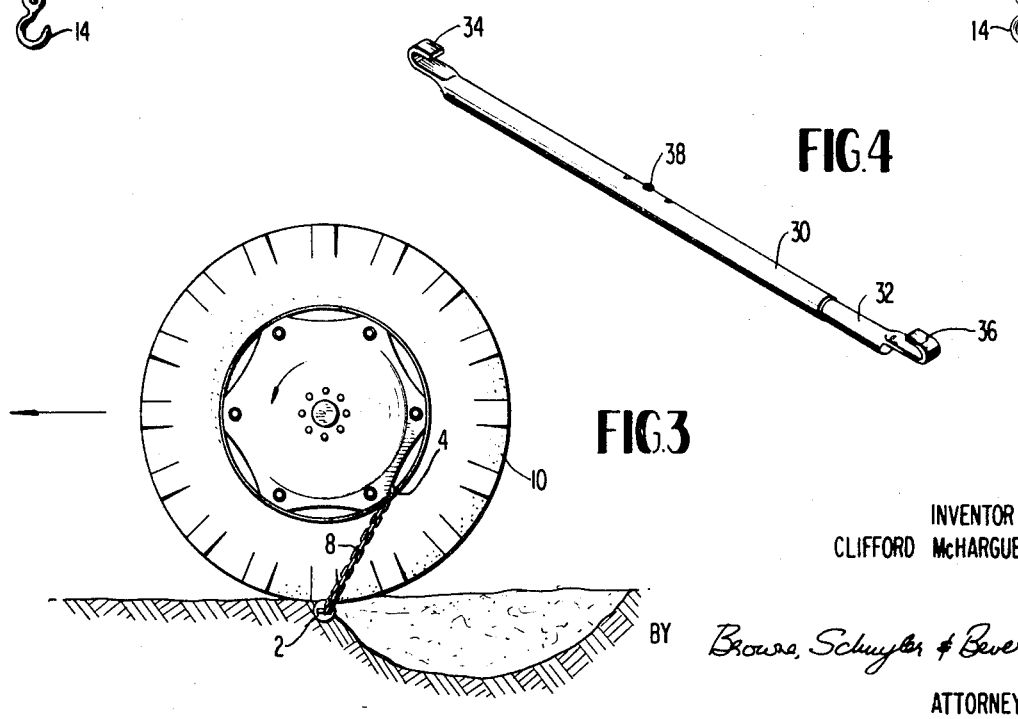
FIG.4
FIG.3
INVENTOR
CLIFFORD McHARGUE
BY Browne, Schuyler & Beveridge
ATTORNEYS 3,580,317

DEVICE FOR EXTRACTING A MIRED MOTOR VEHICLE

BACKGROUND

This invention relates to apparatus for extracting a vehicle from a mired condition through the utilization of the vehicle's own power. An elongated bar underlies and spans transversely between the spaced apart tread surfaces of the vehicle. The bar has connectors which are attached for movement with the tread surfaces so that advancement of the tread surfaces under power will drive them over the bar which is supported by the undisturbed ground therebetween.

It is known from U.S. Pat. No. 2,713,394 to Howell that a vehicle may be extracted from a mired condition by driving it over a bar spanning between and lying beneath the tread surfaces. This previous technique, however, lacks the simplicity of the present invention since it requires a bar having extremely high structural strength and a permanent modification of the vehicle.

SUMMARY

This invention is a bar designed to span beneath and below the spaced apart tread surfaces of a mired vehicle. The bar is attached to move with the tread surfaces so that advancement of the tread surfaces will elevate the vehicle from its mired condition.

The bar itself is a substantially rigid elongated member having a length capable of underlying both of a pair of spaced tread surfaces. Spaced apart connector means on the elongated member are designed to connect it to a lug, wheel or other portion of the movable ground-engaging assemblies.

The invention disclosed herein is significantly simpler, less expensive and easier to use than previous apparatus of this type. It is conveniently carried aboard the vehicle when its adjustable length is reduced to a minimum. It is adjusted to the proper length for use, and its opposite ends are easily attached to the lugs or wheels of a vehicle. The attachment of its opposite ends to the lugs or wheels will result in upward forces at the ends of the bar to minimize the bending of the bar. Further, any tendency of the midportion of the bar to flex upwardly will produce counteracting tensile forces in the bar to deter further upward flexing.

The principles and advantages of this invention will be further explained in the drawings and specification which follows.

IN THE DRAWINGS

FIG. 1 is a perspective view showing the device of this invention mounted on a tractor at a location where forward movement of the tractor wheels will remove it from its mired condition, FIG. 2 is a sectional view of the preferred form of the invention shown in FIG. 1;

FIG. 3 is a side elevation illustrating the principle of the preferred form of the invention; and FIG. 4 is a perspective view of an alternative form of the invention adapted for use with tracked or lug-type vehicles.

DESCRIPTION OF THE PREFERRED EMBODIMENT

As stated previously, this invention involves a novel device for extracting a vehicle from a mired condition.

It is well known that vehicles operating in muddy or snow-covered areas may become mired so that the lowermost tread surface of the vehicle will be substantially below the surface of the adjacent ground. The vehicle becomes mired when the nature of the underlying ground and the tractive ability of the tread surface prevent the generation of sufficient horizontal forces to move the vehicle forwardly or rearwardly. Movement of the tread surfaces in many instances seats the vehicle further into the ground and makes its removal more difficult.

The most common method of extracting a mired vehicle is to tow it with another vehicle which either is on a sounder footing or has superior tractive abilities. It also is known to drive the vehicle over a transversely oriented beam which is engaged by members radiating from each of a spaced apart pair of wheels. This former method requires a permanent modification of the vehicle itself, and demands considerable structural strength in the transverse beam.

This invention also involves the principle of driving the vehicle over a transversely oriented beam or rod; however, it departs from the prior art in several important respects. Use of the invention does not require any modification of the vehicle, nor does it require a transverse beam having the structural strength necessitated heretofore.

Basically, this invention calls for a substantially rigid elongated bar, rod or beam member which is provided at spaced apart points with connectors which are engageable with a ground-engaging assembly such as a tire, wheel or lug of a tracked vehicle. Preferably, the elongated member has an adjustable length so the connectors will lie approximately at the opposed outer edges of the vehicle's tread surfaces.

In FIG. 1, it will be seen that the elongated rod 2 is attached to the wheels 4 and 6 of a tractor by means of flexible members such as chains 8, only one of which is shown. When the vehicle is to be moved in a forward direction, the rod 2 is placed forwardly of the lowermost tread surfaces of the tires 10 and 12.

Each of the chains 8 is provided with a hook member 14 shown in FIG. 2 which is used to attach its respective chain and the rod to the hub of the vehicle wheel. The rod 2 has an adjustable length due to its construction from two telescopically related sections 16 and 18 which are locked in fixed relationship by inserting a lock pin such as bolt 20 through aligned pairs of openings 22 and 24.

When not in use, the rod 2 is conveniently carried on the vehicle by telescoping its length to a minimum. If the vehicle becomes mired, the rod 2 is extended to a length where the chains 8 lie near the outer edges of the tread surfaces. The hooks 14 are then attached to the wheel hub with the rod lying as shown in FIG. 1. The ground-engaging assemblies which include the hubs, wheels and tires are then rotated under the vehicle's power in a direction where they tend to overrun the rod 2. This rotation forcibly moves the midportion of the rod 2 against the undisturbed ground between the tires and tends to elevate and advance the mired portion of the vehicle. Ideally, the rod 2 will stay very close to the surface of the undisturbed ground as shown in FIG. 3 to elevate the vehicle's tread surfaces onto the undisturbed ground. However, even if the rod 2 partially embeds itself, it will continue to impel the vehicle in an upward and forward direction.

The alternative form of the invention shown in FIG. 4 is adapted for use on tracked vehicles. It includes a pair of telescopically related sections 30 and 32, having hooked end portions 34 and 36 which are adapted to engage the outer peripheral edges of the lugs on a tracked vehicle. When the lugs are engaged by the hooked end portions 34 and 36, a lock bolt 38 prevents further telescoping of the sections 30 and 32, thus maintaining the device in its affixed condition. Its use is similar to that described in connection with FIGS. 1—3.

The strength required of the transverse rods is minimized due to their attachment of the moving assemblies. Referring to FIG. 1, it will be appreciated that rotation of the wheel assemblies will create a force having an upward component on the midportion of the rod 2, while the tread surfaces of the vehicle will exert downward forces near the ends of the rod. The bending moment created by these forces is significant and would require an extremely strong rod 2 if the rod were simply used alone. However, according to this invention the chains 8 or hooked end portions 34 and 36 will counteract the bending moment by exerting a force having an upward component on the ends of the elongated rod. This reduces the bending stresses in the midportion of the rod and minimizes the strength requirement of these elements.

The foregoing description relates only to the presently preferred embodiments of the invention. Various modifications and improvements thereto are contemplated in the development of this art. Accordingly, this invention is not limited only to this disclosure but encompasses the variant devices falling within the terms and spirit of the following claims.

I claim:

1. A device for extracting a mired motor vehicle having a pair of movable ground-engaging assemblies with spaced apart tread surfaces each adjacent opposite sides of the vehicle having portions located below the level of the adjacent ground surface, said device comprising a substantially rigid bar having a substantially uniform thickness throughout a length capable of underlying both tread surfaces, and a pair of connector means attached to the bar at portions spaced apart a distance at least as great as the maximum distance between the tread surfaces for inextensibly connecting the bar to both of the ground-engaging assemblies.

2. A device according to claim 1 wherein each connector means includes a hook and an elongated flexible member attaching the hook to the bar.

3. A device according to claim 2 in combination with a motor vehicle having rubber tires mounted on wheels, each of said elongated flexible members lying laterally outside its respective tire and being connected to its respective one of the wheels.

4. A device according to claim 1 having means for adjusting the distance between the spaced apart portions where the connector means are attached to the bar, thereby permitting the positioning of the connector means approximately at the opposed outer edges of the tread surfaces.

5. A device according to claim 4 wherein each connector means includes a hook and an elongated flexible member attaching the hook to the bar.

6. A device according to claim 5 in combination with a motor vehicle having rubber tires mounted on wheels, each of said flexible members being connected to one of the wheels.

7. A device according to claim 1 wherein the connector means comprises a pair of variably spaced hooks which are open in opposite directions facing axially of the bar, said hooks being attached directly to the bar for connection to lug-type tread surfaces.

8. A device according to claim 7 wherein the elongated member includes a pair of slidably interconnected sections, a said hook element being rigidly attached to each of said sections, and means for locking the sections together at a fixed relative position.

9. A motor vehicle having a pair of movable ground-engaging assemblies with spaced apart tread surfaces each adjacent opposite sides of the vehicle and a device for extracting such a vehicle when in a mired condition; said device comprising a substantially rigid bar having a portion with a substantially uniform thickness extending between and underlying both tread surfaces, and connector means each inextensibly connecting one of said ground-engaging assemblies with a point on the bar which lies laterally outwardly of the tread surface associated with the respective ground-engaging assembly.

10. A device according to claim 9 wherein the ground-engaging assemblies are wheels and rubber tires mounted thereon, said connector means including elongated flexible members connected to respective said wheels.

11. A device according to claim 9 having means for adjusting the distance between the spaced apart portions where the connector means are attached to the bar, thereby permitting the positioning of the connector means approximately at the opposed outer edges of the tread surfaces.